(12) United States Patent
Kumar et al.

(10) Patent No.: US 8,392,394 B1
(45) Date of Patent: Mar. 5, 2013

(54) MERGING SEARCH RESULTS

(75) Inventors: Rasika S. Kumar, Mountain View, CA (US); James R. Muller, Palo Alto, CA (US); Jacqueline Frances Bavaro, Palo Alto, CA (US); Jack Menzel, Mountain View, CA (US); Amit Singhal, Palo Alto, CA (US); Eugene Nudelman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 128 days.

(21) Appl. No.: 12/773,624

(22) Filed: May 4, 2010

(51) Int. Cl.
*G06F 17/30* (2006.01)
(52) U.S. Cl. .......................... 707/706; 707/723
(58) Field of Classification Search .................. 707/706, 707/723
See application file for complete search history.

(56) References Cited

U.S. PATENT DOCUMENTS

| | | | |
|---|---|---|---|
| 6,546,388 B1 * | 4/2003 | Edlund et al. | 1/1 |
| 6,772,150 B1 * | 8/2004 | Whitman et al. | 707/721 |
| 6,944,612 B2 * | 9/2005 | Roustant et al. | 707/706 |
| 7,103,589 B1 * | 9/2006 | Kepler et al. | 707/706 |
| 7,188,100 B2 * | 3/2007 | De Bellis et al. | 707/706 |
| 7,206,780 B2 * | 4/2007 | Slackman | 1/1 |
| 7,302,423 B2 * | 11/2007 | De Bellis | 707/723 |
| 7,330,857 B1 * | 2/2008 | Svingen et al. | 707/706 |
| 7,707,201 B2 * | 4/2010 | Kapur et al. | 707/706 |
| 7,894,984 B2 * | 2/2011 | Rasmussen et al. | 701/452 |

* cited by examiner

*Primary Examiner* — Kim Nguyen
(74) *Attorney, Agent, or Firm* — Bracewell & Giuliani LLP

(57) ABSTRACT

Methods, systems, and apparatus, including computer programs encoded on a computer storage medium, for merging search results. In one aspect, a method combines search results responsive to a query that are obtained from a local search engine and a universal search engine such that the combined search results are ordered and presented in a way that emphasizes certain business entities in the results.

25 Claims, 7 Drawing Sheets

FIG. 1C

MERGING SEARCH RESULTS

BACKGROUND

This specification relates to combining search results from different search engine systems.

Internet search engines provide information about Internet accessible resources (e.g., web pages, images, text documents, multimedia content) that are responsive to a user's search query by returning a set of search results in response to the query. A search result includes, for example, a Uniform Resource Locator (URL) for the resource and a snippet of information. The search results can be ranked according to scores assigned to them by a scoring function. The scoring function scores the search results according to various signals, for example, where (and how often) query terms appear in the search results and how common the query terms are in the search results indexed by the search engine.

SUMMARY

In general, one innovative aspect of the subject matter described in this specification can be embodied in methods that include the actions of obtaining first search results responsive to a query from a first search engine system where the first search engine system utilized an index and a scoring algorithm to respectively identify and score each of the first search results; obtaining different second search results responsive to the query from a second search engine system where the second search engine system utilized a different index and a different scoring algorithm to respectively identify and score each of the second search results; obtaining re-scored first search results for the query which are a portion of the first search results that have each been scored by the different scoring algorithm; combining the re-scored first search results that are authority results with the second search results, in which the authority results occur in a portion of the first search results having highest scores, and in which an authority result refers to an authority page of a business entity; ordering the authority results in the combined second search results to correspond to a relative order of authority results in the first search results; and providing the ordered second search results and the first search results to a client device in response to the query. Other embodiments of this aspect include corresponding systems, apparatus, and computer programs, configured to perform the actions of the methods, encoded on computer storage devices.

These and other embodiments can each optionally include one or more of the following features. Each of the re-scored first search results that is an authority result has a respective score that exceeds a threshold and in which the score is based on the result's relevance to the query and distance from the client device. A number of re-scored first search results that are authority results that occur in the portion of the first search results and have highest scores exceeds a threshold. Ordering further comprises placing the ordered authority results before other results in the combined second search results. The authority page of the business entity is the homepage of the business entity. A business entity corresponds to a unique street address, telephone number, and business title combination. A business entity corresponds to a unique uniform resource locator and business title combination. Providing the ordered second search results and first search results to the client device further comprises merging the ordered second search results and the first search results and providing the merged results to the client device. Merging further comprises positioning the ordered second search results at a position among the first search results in which the position is determined based on a number authority results in a top number of first search results. Merging further comprises combining matching results from the ordered second search results and the first search results into a single result. Matching results represent the same business franchise. Matching results represent the same authority result.

Providing further comprises selecting a presentation format for the ordered second search results and the first search results based on a number of authority results in the first search results. Providing further comprises providing a quick scan column for the ordered second results.

In general, one innovative aspect of the subject matter described in this specification can be embodied in systems that include a conjoiner engine configured to combine portions of local search results responsive to a query that are obtained from a local search engine system and universal search results responsive to the query that are obtained from a different universal search engine system, in which the local search results and the universal search results have respective scores as determined by their respective search engine systems; a re-ranker engine configured to order authority results that occur in the combined search results to correspond to a relative order of authority results in the universal search results in order to create ordered combined results, in which the authority results occur in a portion of the local search results having highest scores, and in which an authority result refers to an authority page of a business entity; and a merger engine configured to merge the ordered combined results with the universal search results to create merged results. Other embodiments of this aspect include corresponding methods, apparatus, and computer programs, configured to perform the actions of the methods, encoded on computer storage devices.

These and other embodiments can each optionally include one or more of the following features. The conjoiner engine is further configure to submit a portion of the universal search results to the local search engine system so that they will be re-scored by the local search engine system. Each of the re-scored universal search results that is an authority result has a respective score that exceeds a threshold and in which the score is based on the result's relevance to the query and distance from the client device. The re-ranker engine is further configured to place the ordered combined results before other results. The authority page of the business entity is the homepage of the business entity. A business entity corresponds to a unique street address, telephone number, and business title combination. A business entity corresponds to a unique uniform resource locator and business title combination. The merger engine is further configured to position the merged results at a position among the universal search results in which the position is determined based on a number authority results in a top number of universal search results. The merger engine is further configured to combine matching results from the merged results and the universal search results into a single result. Matching results represent the same business franchise. Matching results represent the same authority result. The merger engine is further configured to select a presentation format for the merged results based on a number of authority results in the universal search results. The presentation format includes a quick scan column. The system further comprises client device configured to received the merged results and the selected presentation format from the system.

Particular embodiments of the subject matter described in this specification can be implemented so as to realize one or more of the following advantages. The diversity of search results returned by a search engine can be improved using the results of at least one other search engine. The overall quality of the search results can be improved. An improved user interface for presenting combined results from multiple search engines clusters results referring to the same business entity under a single result. The presentation format of combined search results can be selected based on a density of business entities. The presentation format is a consistent format for displaying data to make comparing business entities easier.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1C illustrates an example of another graphical user interface for presenting merged search results.

Like reference numbers and designations in the various drawings indicate like elements.

DETAILED DESCRIPTION

Figure 1A:
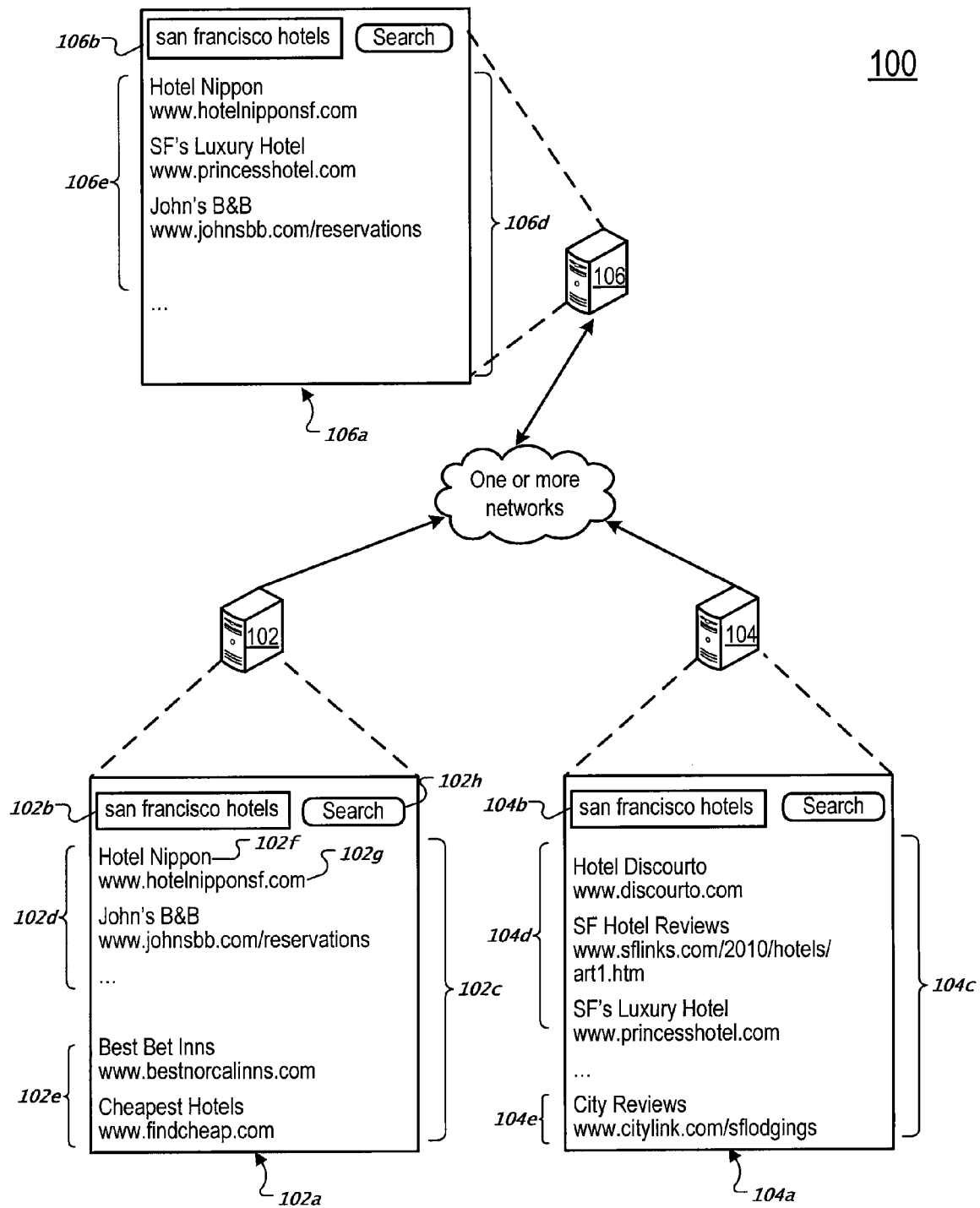
FIG. 1A illustrates combining of example search results.

FIG. 1A illustrates combining of example search results. Different search engine systems having different ways indexing and scoring search results. For instance, a general purpose Internet search engine can rank results differently than a special-purpose search engine. By way of illustration, a search engine focused on finding local businesses in proximity to a user's location will present different search results for a query than a general-purpose search engine since the general purpose search engine's result scoring algorithm may not take into account, or emphasize if it does, the distance from a business establishment associated with the search result to the geographic location of the device which submitted the query. By way of illustration, a local business search engine system 102 receives the query 102b "san francisco hotels" in graphical user interface (GUI) 102a. Users can submit queries by interactively selecting the search button 102f, for example.

In response to the submitted query 102b, the search engine system 102 returns search results 102c. Each search result includes a name or title 102f and a URL 102g which is the address of a resource, however other types of search results are possible including those that include an image, a map, a descriptive snippet of text, user rankings, reviews, and so on. Continuing with the illustration, the general purpose Internet search engine system 104 receives the same query 104b "san francisco hotels" in graphical user interface 104a. In response to the query 104b, the search engine system 104 returns search results 104c.

Notice in this example that the highest-ranked search results (102d, 104d) for the two search engines differ. However, overall some of the search results (102c, 104c) refer to the same business entities. The business entity referred to by a search result can be determined by the URL of the search result resource (e.g., 102f) if the URL matches a web home page ("authority page") for the business entity, or if information in the resource (e.g., web page) referred to by the URL includes information that identifies the business entity such as the business entity's title, address and phone number, for example.

In various implementations, one search engine's search results can be modified by the search results generated by one or more other search engines to improve the diversity and/or ranking of the former. In some implementations, search results 102c returned by the local search engine system 102 can be modified based on the search results 104c returned by the Internet search engine 104.

Generally speaking, a result merger server 106 acts as an intermediary between one or more search engine systems to respond to a query 106b with merged search results 106d from the search engine systems. In some implementations, the result merger server 106 determines if highly-ranked results 104d returned by the Internet search engine system 104 that refer to business entities would be highly ranked by the scoring algorithm of the local search engine system 102. If so, those results can be combined with the local search results 102 to form merged search results 106d as shown in graphical user interface 106a. In this example, the top result "Hotel Discourto" in the search results 104c is not included in the top merged search results 106e since "Hotel Discourto" was not ranked highly by the local search engine system 102. However, the top result "SF's Luxury Hotel" was ranked highly by the local search engine system 102 and, as a result, is included with the top merged results 106e. In this way, relevant search results that may not have been included in the top local search results 102d can be added to those results to improve diversity. Further details regarding how the result merger server 106 performs these operations.

Figure 1B:
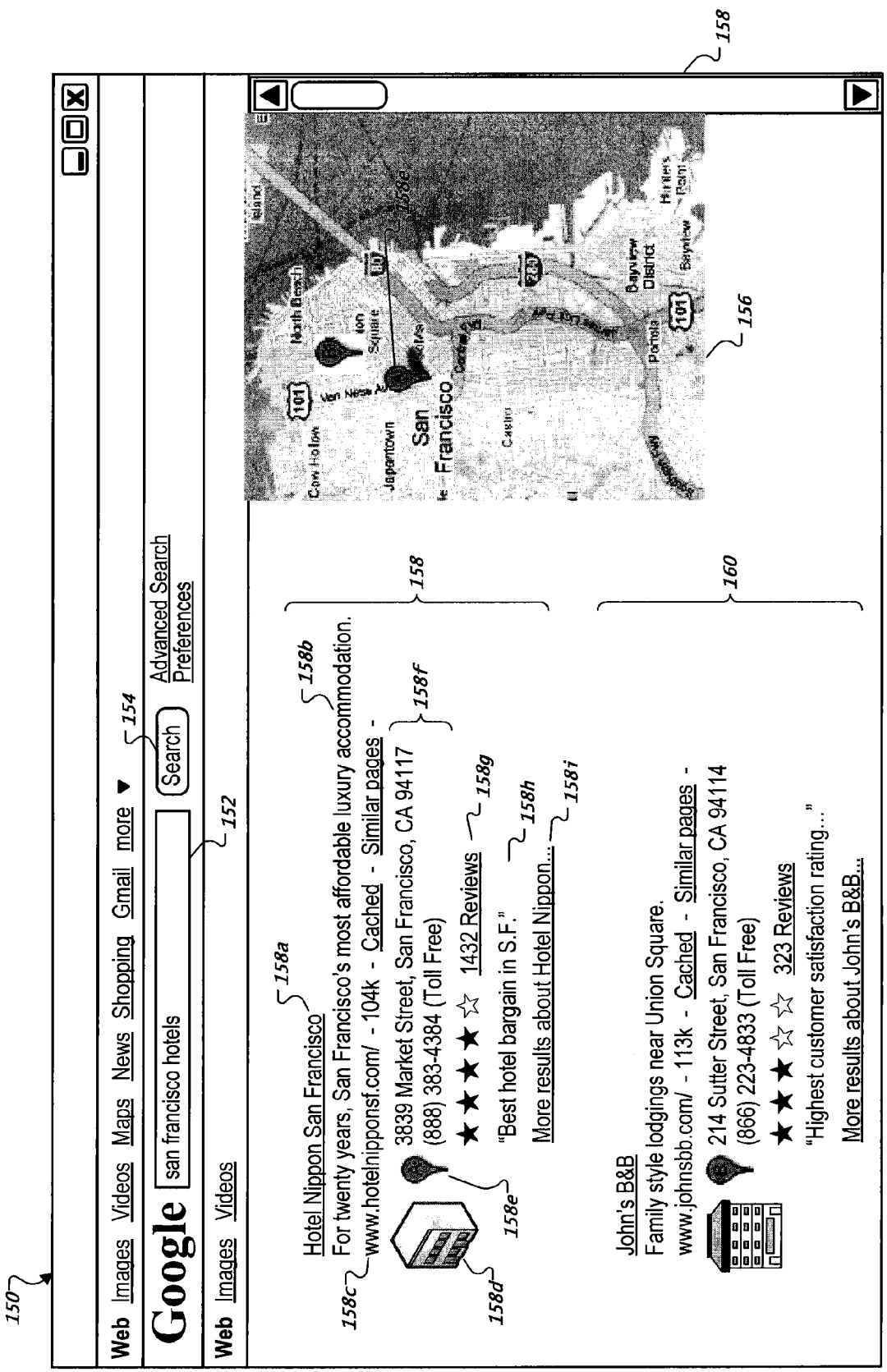
FIG. 1B illustrates an example graphical user interface for presenting merged search results.

FIG. 1B illustrates an example graphical user interface (GUI) 150 for presenting merged search results as can be implemented in a web browser or other software application. The GUI 150 includes a text input field 152, where users can type queries, and an interactive button 154 which submits the queries when it is selected. In some implementations, the GUI 150 displays merged search results for local and universal web searches. The GUI 150 includes a map 156 which displays pin points (e.g., 158e) on the map that indicate to the location of business entities in the search results (e.g., 158a). In this example, two search results are shown: search result 158 and search result 160. However, additional search results can be shown by user manipulation of the scroll bar 158. In some implementations, the map 156 is programmed (e.g., with JAVASCRIPT) to stay visible as the search results are scrolled using the scroll bar 158.

Each search result can include one or more of a business title (e.g., 158a), a snippet of text which describes the business (e.g., 158b), a resource address (e.g., 158c), a representative image (158d), local facts such as an address and a telephone number (e.g., 158f), a hyperlink to user reviews of the business (e.g., 158g), a review snippet which can indicate why a user might like this business establishment (158h), and a hyperlink to other results about the business (158i) which have been hidden in order to maximize the number of unique results presented in the GUI 150. In some implementations, review snippets come from one of the reviews that have been associated with the business. For example, an algorithm can be used to choose the most useful snippets based on length and tone. Search results that do not refer to a business entity can be presented without some of this information. For example, a search result that refers to an aggregator website (e.g., www.yelp.com) with information on many businesses would not have a business entity address.

In some implementations, all results for a given authority page, domain, or business franchise are clustered together into a single result (e.g., 158) and one of the results from each cluster is chosen to be displayed. Single search results that represent a cluster of search results can be grouped together into a contiguous portion of the search results (e.g., on a single page) or interspersed with non-clustered search results over one or more of the search engine's result pages. Other ways of clustering search results are possible. In other implementations, multiple results per cluster can be displayed. In further implementations, some results represent clustered results and others represent non-clustered results.

Figure 1C:
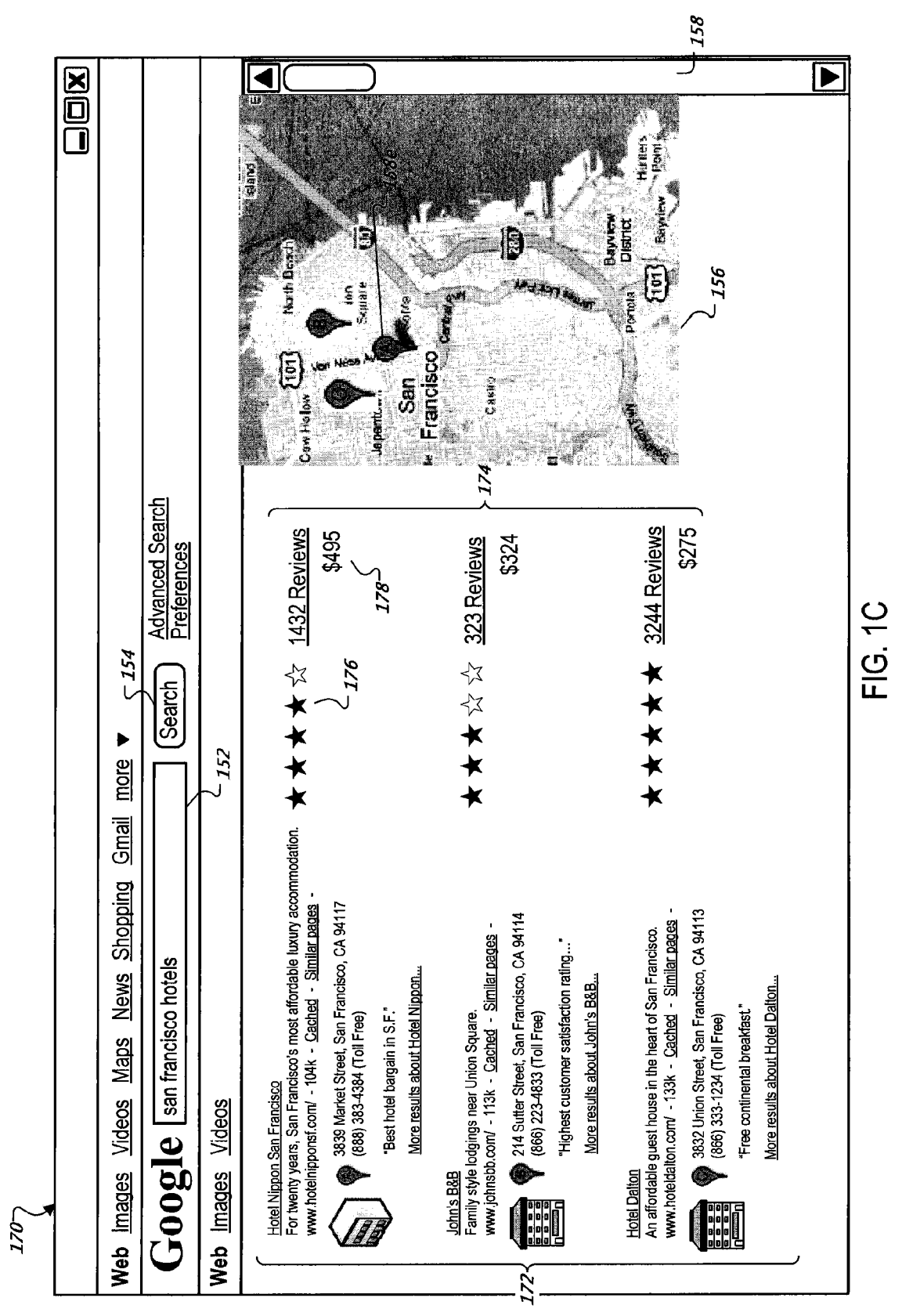

FIG. 1C illustrates an example of another graphical user interface for presenting merged search results. As before, the GUI 170 includes a text input field 152, where users can type queries, and an interactive button 154 which submits the queries when it is selected. In some implementations, the GUI 170 displays merged search results for local and universal web searches. The GUI 170 includes a map 156 which displays pin points (e.g., 158e) on the map that indicate to the location of corresponding business entities in the search results 172. A quick scan column 174 provides useful information which enables users to easily compare search results based on different criteria. In some implementations, the comparison criteria can be the average user ratings for a business 176 and a price for a product or service provided by the business 178. In the case of a hotels, for instance, the price can be the basic room rate for one night at the hotel. In some implementations, prices are obtained from advertisers. User ratings can be culled from different sources such as aggregator websites that host reviews of businesses or third party information providers, for example. Other comparison criteria can be used in the quick scan column 174 including, for instance, the distance from the user's location to the business, the type of business (e.g., the type of cuisine served by a restaurant), and combinations of these. Other comparison criteria are possible.

Figure 2:
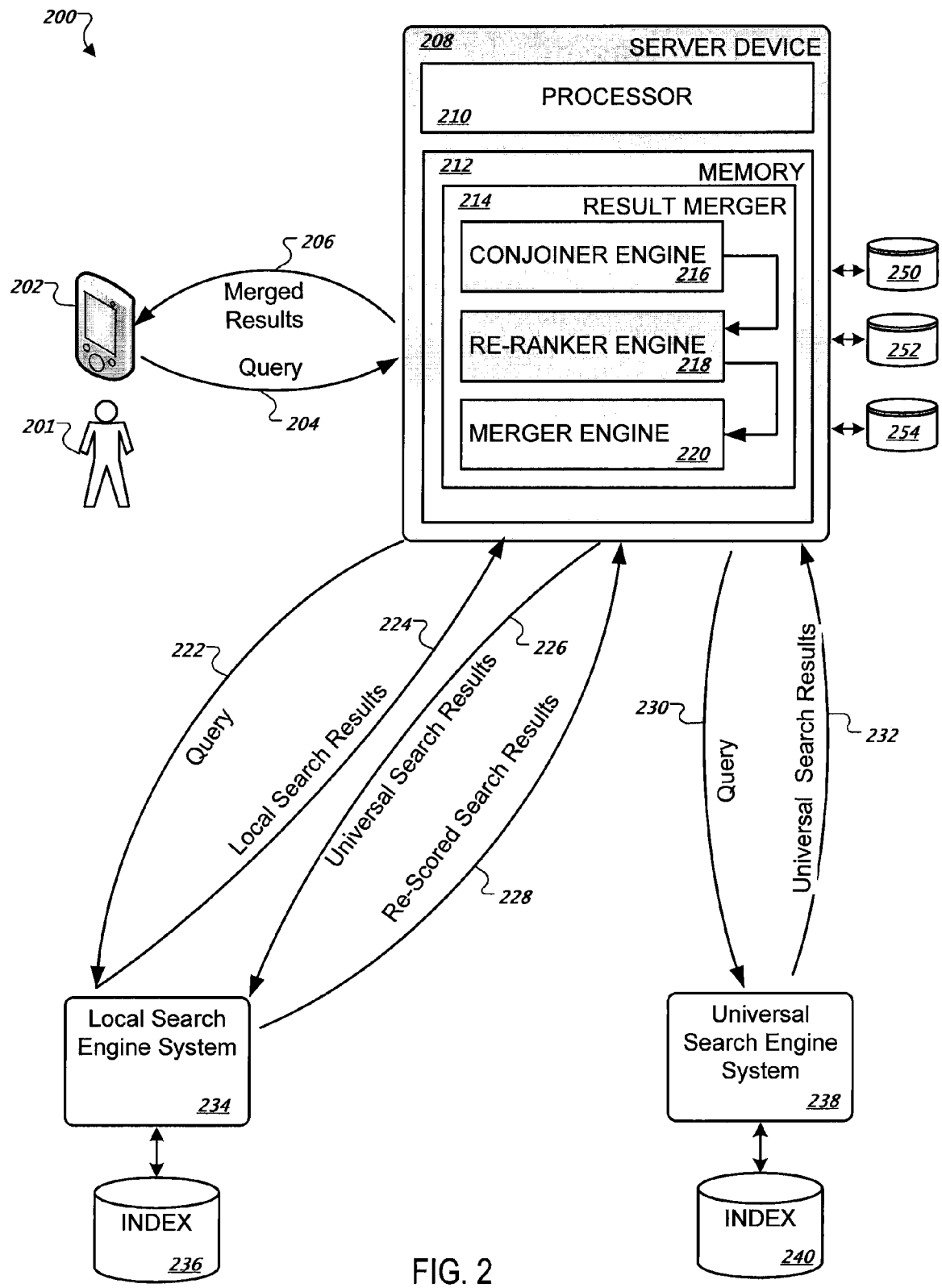
FIG. 2 illustrates an example search result merger system for merging search results from search engine systems.

FIG. 2 illustrates an example search result merger system for merging search results from search engine systems as can be implemented in an Internet, intranet, or other client/server environment. (Search engine systems are described further below with reference to FIG. 3.) The system 200 includes one or more client devices 202, one or more server devices 208, and at least two search engine systems 234 and 238. The client device 202, server device 208, and search engines 234, 238 communicate through one or more computer or data communication networks.

A user 201 interacts with the system 200 through the client device 202 or other device. For example, the client device 202 can be a personal computer within a local area network (LAN) or wide area network (WAN), or a mobile device such as a smart phone or a tablet computer connected to one or more wireless networks. The client device 202 generally includes a random access memory (RAM) (or other memory and/or a storage device) and a processor. The processor is a single or multi-threaded microprocessor having one or more processor cores, for example. The processor is structured to process instructions stored in the client device's RAM or in other memory and/or a storage device included with the client device. For example, the instructions can implement a web browser or other software application. The client device 202 can also include one or more input/output devices such as a display, a keypad, a microphone, a camera, a touch-sensitive surface, a speaker, an accelerometer, and so on.

A user 201 connects to the result merger 214 to submit a query 204. The user 201 submits the query 204 to the result merger 214 by way of a web browser or other user interface on the client device 202. A query can comprise text, audio content (e.g., spoken text captured by a microphone), an image (e.g., a snapshot of a business location or QR code captured by a camera), a hand or finger gesture on a touch-sensitive surface, the motion of the client device 202, or combinations of these. The query 204 is received by the result merger 214 which forwards the query 204 to two or more search engine systems (e.g., local search engine system 234 and universal search engine system 238), merges the search results returned by the search engine systems, and provides the merged results 206 to the client device 202.

The result merger 214 is implemented on one or more server devices 208 in one or more locations. A server device 208 includes a memory device 212, which can include instructions that implement the result merger 214 loaded therein. A processor 210 is structured to process instructions within the server device 208. These instructions can implement one or more components of the result merger 214. The processor 210 can be a single or multi-threaded processor and can include multiple processing cores. The processor 210 can process instructions stored in the memory 212 related to the result merger 214 and can send information to the client device 202, through one or more networks, to create a graphical presentation in a user interface of the client device 202 (e.g., a search results web page displayed in a web browser).

In some implementations, the result merger 214 comprises three logical components: a conjoiner engine 216, a re-ranker engine 218, and a merger engine 220. The functionality of these components can combined into fewer components or divided into more components. Moreover, the components need not all reside on the same server device 208.

The conjoiner engine 216 obtains search results responsive to a query from two or more search engine systems and combines the results, or portions thereof, based on one or more similarities between them. Generally speaking, search engine systems include one or more indexes which reference a collection of resources and which are used to identify resources that are responsive to a queries. Internet search engine indexes index web pages on the world wide web, for example. Search engine systems can use one or more scoring algorithms to score resources that are retrieved using the indexes. Document scores can be used to rank retrieved resources and create a set of search results that are returned in response to queries.

In some implementations, the conjoiner engine 216 joins portions of results obtained from a local search engine system 234 and a universal search engine system 238. The local search system 234's index 236 refers to resources that identify business entities. A business entity corresponds to a unique street address, telephone number, and business title combination. Alternatively, a business entity corresponds to a unique URL and business title combination. Other types of business entities are possible, however. A business entity can also be associated with an authority page. In some implementations, an authority page is the resource address (e.g., URL) of the business entity's official home page on the world wide web. Different business entities can have a common authority page, as is the case with a franchise, for example. Business entities can also be associated with a URL which may or may not be the same as a authority page for the business entity. In some cases, the URL can refer to a web page "under" the authority page. By way of illustration, a authority page for a business entity is "http://www.pizzagun.com" and a URL for the business entity is "http://www.pizzagun.com/california/sanfran.html".

Business entity information referred to in the index 236 can be provided to the local search engine system 214 by provider feeds, business centers and users, for instance. The following are two examples of business entity information:

| | |
|---|---|
| Business Title: | Google Inc. |
| Street Address: | 1600 Amphitheatre Parkway |
| | Mountain View, CA 94043 |
| Telephone Number: | +1 650-253-0000 |
| Authority page: | http://www.google.com |
| Business Title: | Pizza Gun Corporation, Store #34 |
| Street Address: | 3838 Bellevue Lane, |
| | Minneapolis, MN 55402 |
| Telephone Number: | +1 650-253-0000 |
| Authority page: | http://www.pizzagun.com |
| URL: | http://www.bobspizzaguns.com |

In some implementations, the local search engine system 234 scores business entities according to their relevance to a query and their distance from the current geographic location of the client device 202 based on the street address of the business entity.

The universal search engine system 238's index 240 refers to resources such as web pages and, optionally, resources stored in databases such as digitized books, videos, images, product information, and so on. The search engine systems employed by the conjoiner engine 216 can have indexes which index none of the same resources, some of the same resources, or all of the same resources. The universal search engine system 238 uses one or more scoring algorithms to score and then rank resources which are responsive to the queries it receives. In some implementations, the scoring algorithm Or algorithms used by the universal search engine system 238 are different from those used by the local search engine system 234. For example, the universal search engine system 238's scoring algorithm may not take distance to the client device 202 into account and can rely on other signals or differently weighted signals, instead.

Figure 4:
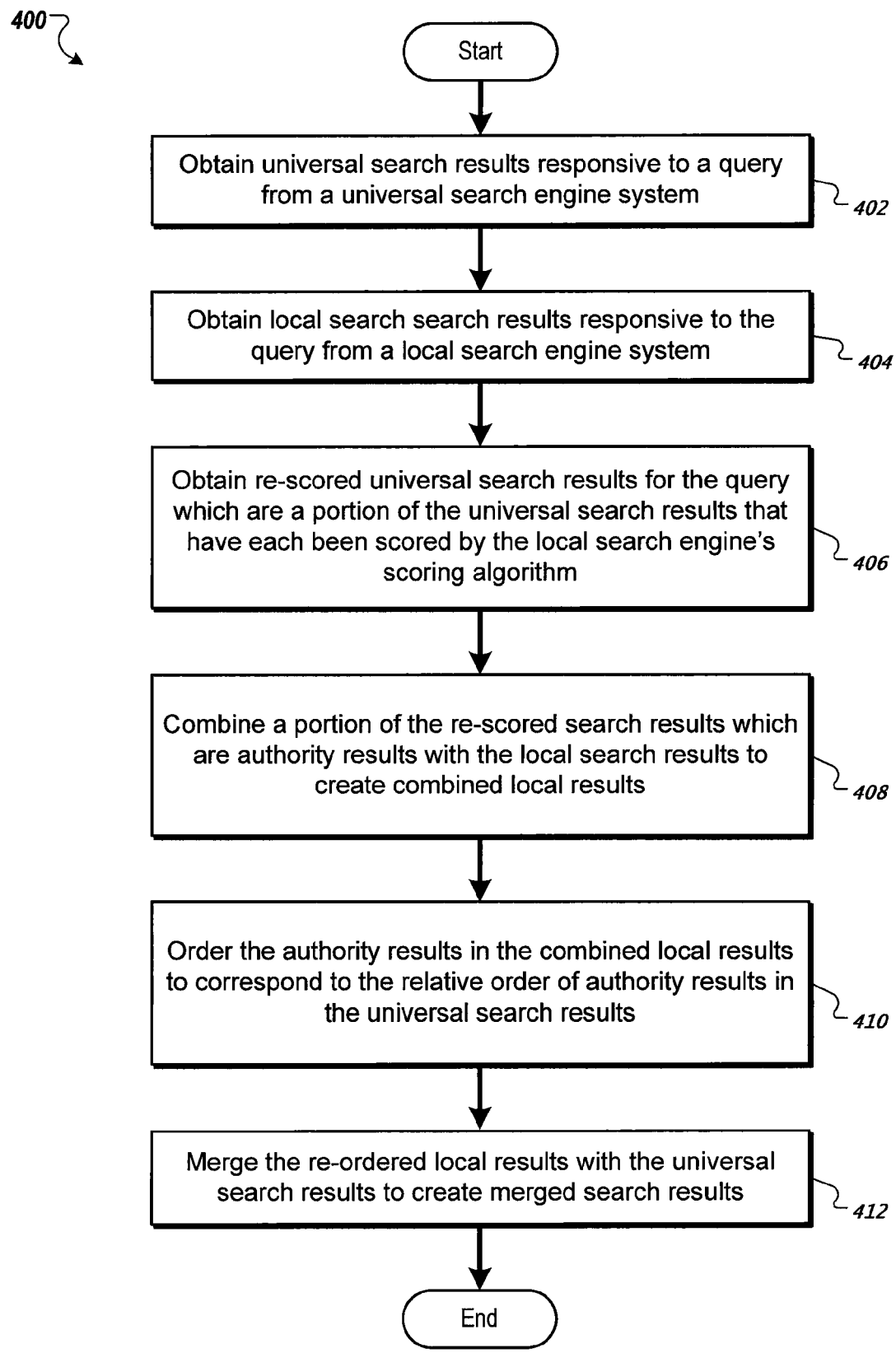
FIG. 4 is a flow diagram of an example technique for providing for merging search results.

FIG. 4 is a flow diagram of an example technique 400 for providing for merging search results. The conjoiner engine 216 submits the query 230 (which corresponds to the query 204 received from the client device 202) to the universal search engine system 238. In some implementations, the query 230 is not the same as query 204. That is, the query 230 can be similar to the query 204, such as being a refinement or rephrasing of the query 204. Using its index 240 and its scoring algorithms, the universal search engine system 238 identifies search results 232 responsive to the query 230 and returns them to the conjoiner engine 216 which receives the search results (block 402).

The conjoiner engine 216 also submits the query 222 (which corresponds to the query 204 received from the client device 202) to the local search engine system 234. In some implementations, the query 222 is not the same as query 204 or query 230. That is, the query 222 can be a refinement or rephrasing of query 204 or 230. Using its index 236 and its scoring algorithms, the local search engine system 234 identifies search results 224 responsive to the query 222 and returns them to the conjoiner engine 216 which receives the search results (block 404).

Next, the conjoiner engine 216 submits a portion (e.g., the top twenty) of the top ranked universal search results 226 received from the universal search system 238 to the local search engine system 234 so that they may be scored by the local search engine system 234's scoring algorithm(s). The re-scored search results 228 are then received from the local search engine system 234 (block 406). Other ways of re-scoring the universal search results are possible. In some implementations, the conjoiner engine 216 re-scores a portion of the universal search results itself using the local search engine system 234's scoring algorithm(s) or a different algorithm. In further implementations, another process re-scores the universal search results.

The re-scored search results 228 which are authority results are then combined with the local search results 224 to create combined local results 250 (block 408). (Duplicate authority results are not added to the local search results 224.) An authority result is a result in which the result's resource refers to an authority page of a business entity. In some implementations, a result's resource refers to an authority page if the resource is the authority page. In other implementations, if the result's resource refers to a web page that contains business entity information which uniquely identifies the business entity then the web page can be considered an authority page. In some implementations, the re-scored search results 228 that are considered high-quality authority results have scores which are above a threshold or in a top range of the re-scored search results (e.g., the top ten) and also appear in a top ranked portion of the universal search results 232.

In some implementations, a re-ranker engine 218 orders the authority results in the combined local results 250 to correspond to the relative order of authority results in the universal search results 232 and creates re-ordered local results 252 (block 410). In some implementations, the re-ranker engine 218 does not re-order the combined local results 250 unless there are a threshold number of authority results (e.g., four). By way of example, assuming that the relative order of authority results in the combined local results (250) was as indicated in TABLE 1 below, the relative order would be changed to be the same as the order of authority results in the universal search results (232).

TABLE 1

| ORDER OF AUTHORITY RESULTS IN COMBINED LOCAL RESULTS (250) | ORDER OF AUTHORITY RESULTS IN UNIVERSAL SEARCH RESULTS (232) |
|---|---|
| Window Replacement Experts www.windowpros.com | Energy Efficient Windows www.bobswindows.com |
| . . . | . . . |
| Upgrade your windows www.johnsonwindows.com | Window Replacement Experts www.windowpros.com |
| . . . | . . . |
| Energy Efficient Windows www.bobswindows.com | Upgrade your windows www.johnsonwindows.com |

The merger engine 220 merges the optionally re-ordered local results 252 with the universal search results 232 to create the merged results 254 (block 412). In some implementations, the re-ordered local results 252 are inserted at a determined position in the universal search results 232. In some cases the position can be determined based on the density of authority pages in top-ranked universal search results 232. For example, if the highest ranked universal search result 232 does not refer to an authority page or two out of the top three universal search results 232 do not refer to authority pages, the re-ordered local results 252 are inserted after the third highest ranked universal search result 232. Otherwise, the re-ordered local results 252 are inserted before the highest ranked universal search result 232. In further implementations, if the highest ranked universal search results refer to different business entities, the re-ordered local results 252 are inserted before them. In further implementations, the insertion position can be determined based on a comparison of the overall quality of the local results as compared to the quality of the web results where the higher quality results are placed before the others. Other ways of determining the insertion position are possible.

In some implementations, the merger engine 220 clusters together all search results in the merged results 254 for the same business entity into a single search result for that entity with a hyperlink to the additional search results for that entity. The single search result could be the highest ranked search result for that business entity, for example. In further implementations, the merged results 254 can be sorted so that all business entity results are contiguous and so that all aggregator results are contiguous. The contiguous business entity search results can be placed ahead of the contiguous aggregator search results, or vice versa, in terms of their order in the merged results 254 based on the number of business entity results versus the number of aggregator results or other factors. If a business entity referred to by a search result does not have an authority page (e.g., a laundromat), the search result can be listed after those that do or its position in the search results can be among business references in non-authority search results.

The presentation format of the merged results 254 can be determined by the merger engine 220 in some implementations based on whether there is strong indication that the user 201 is searching for a list of places verses a single place. In some implementations, if there is a threshold number of identified authority pages in the re-scored results 228 (e.g., four), then this is an indication that the user 201 is looking for a list of places. In some implementations, if the user is looking for a list of places the display format of FIG. 1A can be used to present the merged results 254. The formatted merged results 254 and then provided 206 to the client device 202 in response to the query 204 by the result merger 214.

Figure 3:
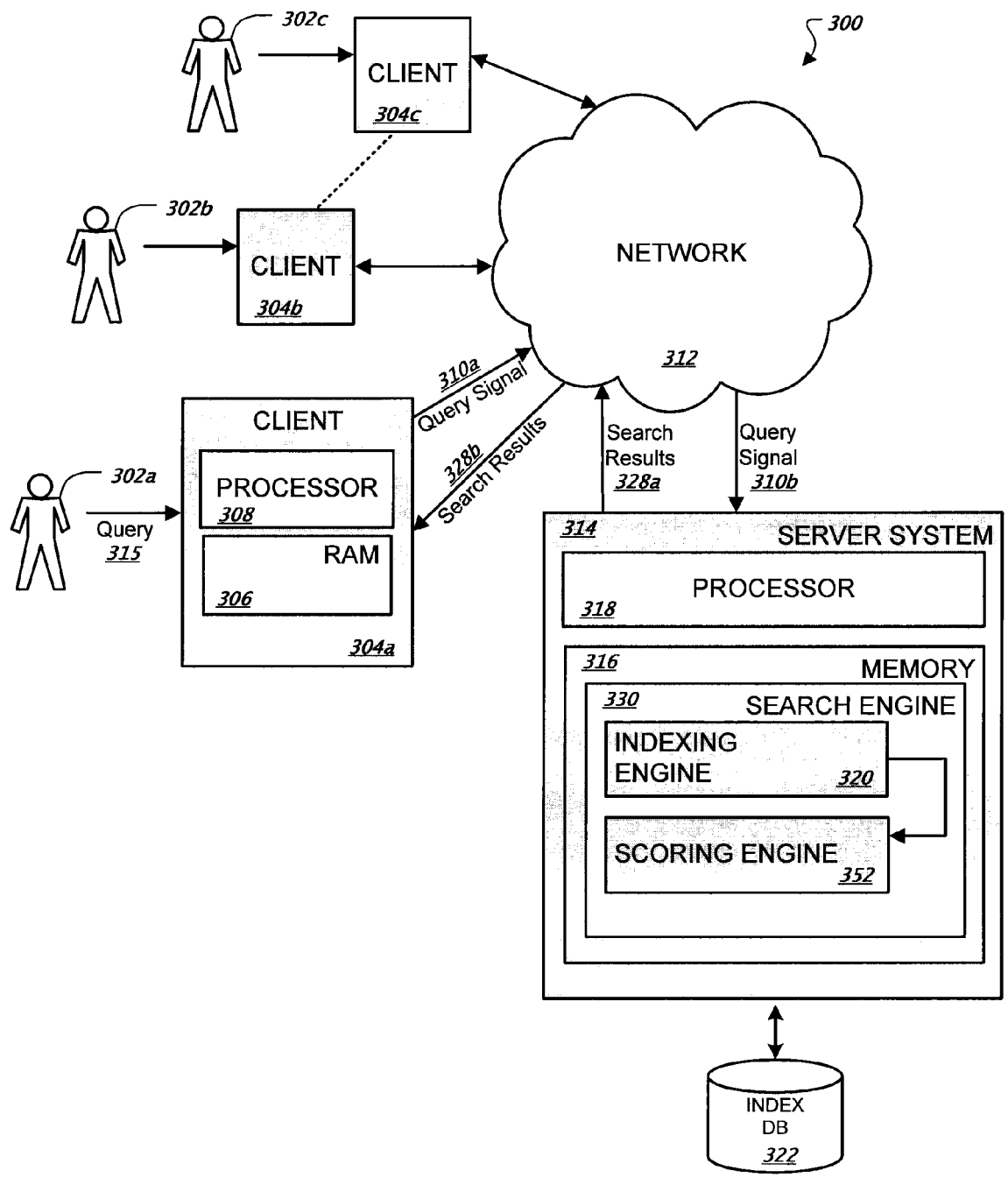
FIG. 3 illustrates an example search system for identifying search results in response to search queries as can be implemented in an Internet, intranet, or other client/server environment.

FIG. 3 illustrates an example search system for identifying search results in response to search queries as can be implemented in an Internet, intranet, or other client/server environment. A user 302 (302a, 302b, 302c) interacts with the system 300 through a client device 304 (304a, 304b, 304c) or other device. For example, the client device 304 can be a computer terminal within a local area network (LAN) or wide area network (WAN). The client device 304 generally includes a random access memory (RAM) 306 (or other memory and/or a storage device) and a processor 308. The processor 308 is structured to process instructions on the client device 304. The processor 308 is a single or multi-threaded processor having one or more processor cores, for example. The processor 308 is structured to process instructions stored in the RAM 306 (or other memory and/or a storage device included with the client device 304) to display graphical information for a user interface. The components shown in FIG. 3 can be combined in various manners and implemented in various system configurations.

A user 302a connects to the search engine 330 within a server system 314 to submit a query 315. When the user 302a submits the query 315 through an input device attached to a client device 304a, a client-side query signal 310a is sent into the network 312 and is forwarded to the server system 314 as a server-side query signal 310l). Server system 314 can be one or more server devices in one or more locations. A server device 314 includes a memory device 316, which can include the search engine 330 loaded therein. A processor 318 is structured to process instructions within the device 314. These instructions can implement one or more components of the search engine 330. The processor 318 can be a single or multi-threaded processor and can include multiple processing cores. The processor 318 can process instructions stored in the memory 316 related to the search engine 330 and can send information to the client devices 304a-c, through the network 312, to create a graphical presentation in a user interface of the client device 304 (e.g., a search results web page displayed in a web browser).

The server-side query signal 310b is received by the search engine 330. The search engine 330 uses the information within the user query 315 (e.g. query terms) to find relevant resources. The search engine 330 can include an indexing engine 320 that actively searches a corpus (e.g., web pages on the Internet) to index the resources found in that corpus (e.g., in index database 322), and the index information for the resources in the corpus can be stored in an index database 322. This index database 322 can be accessed to identify resources related to the user query 315.

The search engine 330 includes a scoring engine 352 to score/rank the resources responsive to the user query 315. The scoring/ranking of the resources can be performed using traditional techniques for determining an information retrieval (IR) score for indexed resources in view of a given query, for example. The relevance of a particular resource with respect to a particular search term or to other provided information may be determined by any appropriate technique. By way of illustration, the scoring engine 352 can determine a score for a resource using the world wide web's link structure. A link (e.g., hyperlink) from resource A to resource B which contains a resource is interpreted as a vote, by resource A, for resource B. In addition to the volume of votes, or links a resource receives, the resource that casts the vote is also considered. Votes cast by resources that are themselves "important" weigh more heavily and help to make other resources "important". If the pointing resources are in turn the targets of links from other important resources, they can be considered more "important", and the first resource can be considered particularly important because it is the target of important (or even highly relevant) resources. Such a technique may be the determinant of a resource's importance or one of multiple determinants. Appropriate techniques can also be taken to identify and eliminate attempts to cast false votes so as to artificially drive up the importance of a resources. Other scoring techniques are possible.

The search engine 330 forwards the final, ranked result list within a server-side search results signal 328a through the network 312. Exiting the network 312, a client-side search results signal 328b is received by the client device 304a where the results are stored within the RAM 306 and/or used by the processor 308 to display the results on an output device for the user 302a. The server system 314 may also maintain one or more user search histories based on the queries it receives from a user and which results that a user selected after a search was performed.

Figure 5:
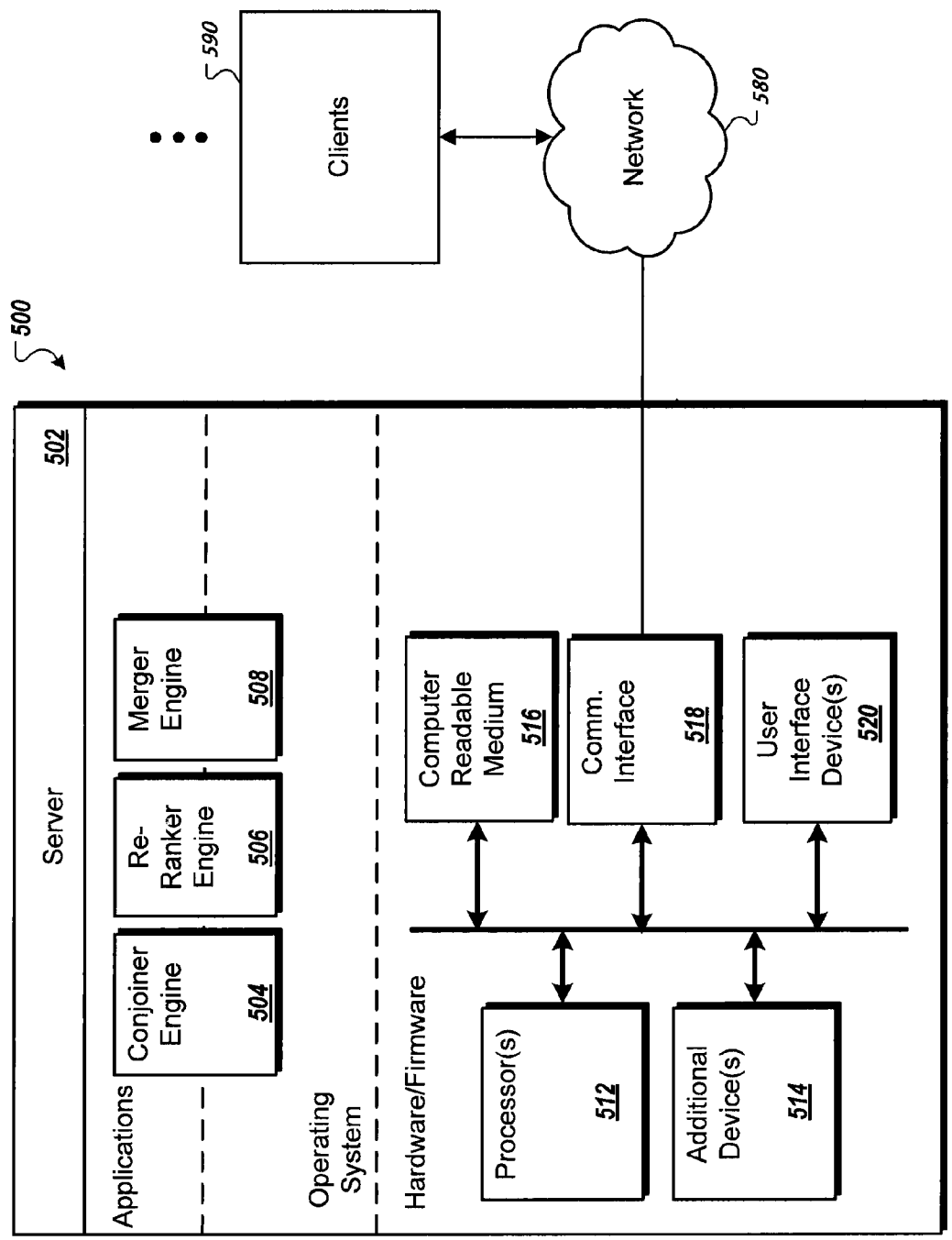
FIG. 5 is a schematic diagram of an example system configured to merge search results.

FIG. 5 is a schematic diagram of an example system configured to merge search results. The system 500 generally consists of a server 502. The server 502 is optionally connected to one or more user or client computers 590 through a network 580. The server 502 consists of one or more data processing apparatus. While only one data processing apparatus is shown in FIG. 5, multiple data processing apparatus can be used in one or more locations. The server 502 includes various modules, e.g. executable software programs, including a conjoiner engine 504 configured to combine search results, a re-ranker engine 506 configured to re-order search results, and a merger engine 508 configured to merge results for the same business entity and format the results for presentation.

Each module runs as part of the operating system on the server 502, runs as an application on the server 502, or runs as part of the operating system and part of an application on the server 502, for instance. Although several software modules are illustrated, there may be fewer or more software modules. Moreover, the software modules can be distributed on one or more data processing apparatus connected by one or more networks or other suitable communication mediums.

The server 502 also includes hardware or firmware devices including one or more processors 512, one or more additional devices 514, a computer readable medium 516, a communication interface 518, and one or more user interface devices 520. Each processor 512 is capable of processing instructions for execution within the server 502. In some implementations, the processor 512 is a single or multi-threaded processor. Each processor 512 is capable of processing instructions stored on the computer readable medium 516 or on a storage device such as one of the additional devices 514. The server 502 uses its communication interface 518 to communicate with one or more computers 590, for example, over a network 580. Examples of user interface devices 520 include a display, a camera, a speaker, a microphone, a tactile feedback device, a keyboard, and a mouse. The server 502 can store instructions that implement operations associated with the modules described above, for example, on the computer readable medium 516 or one or more additional devices 514, for example, one or more of a floppy disk device, a hard disk device, an optical disk device, or a tape device.

A resource can be stored in a portion of an electronic file (e.g., a web page or other document) that holds other resources, in a single electronic file dedicated to the resource in question, or in multiple coordinated electronic files. Moreover, a resource can be stored in a memory without having first been stored in file.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

obtaining first search results responsive to a query from a first search engine system where the first search engine system utilized a first index and a first scoring algorithm to respectively identify and score each of the first search results;

obtaining second search results responsive to the query from a second search engine system where the search engine system utilized a second, different index and a second, different scoring algorithm to respectively identify and score each of the second search results;

identifying a number of first search results that are authority results, wherein an authority result refers to an authority page of a business entity;

re-scoring a portion of the number of first search results that are authority results using the second scoring algorithm;

combining the re-scored first search results that are authority results with the second search results to generate combined second search results, wherein an authority result refers to an authority page of a business entity the authority results in the combined second search results are ordered to correspond to a relative order of authority results in the first search results if the number of first search results that are authority results exceeds a threshold; and providing the combined second search results to a client device in response to the query.

2. The method of claim 1 in which ordering the authority results in the combined second search results further comprises placing the ordered authority results before other results in the combined second search results.

3. The method of claim 1 in which the business entity has a homepage and the authority page of the business entity is the homepage of the business entity.

4. The method of claim 1 in which a business entity corresponds to a unique street address, telephone number, and business title combination.

5. The method of claim 1 in which a business entity corresponds to a unique uniform resource locator and business title combination.

6. The method of claim 1 in which providing the combined second search results further comprises merging the combined second search results and the first search results and providing the merged results to the client device.

7. The method of claim 6 in which merging the combined second search results and the first search results further comprises:

positioning the combined second search results at a position among the first search results that is determined based on a number of authority results in a top number of the first search results.

8. The method of claim 6 in which merging the combined second search results and the first search results further comprises combining matching results from the combined second search results and the first search results into a single result.

9. The method of claim 8 in which matching results represent the same business franchise.

10. The method of claim 8 in which matching results represent the same authority result.

11. The method of claim 6 in which merging the combined second search results and the first search results further comprises selecting a presentation format for the combined second search results and the first search results based on a number of authority results in the first search results.

12. The method of claim 1 in which providing the combined second search results further comprises providing a quick scan column for the ordered second results.

13. A system comprising:
means for obtaining first search results responsive to a query from a first search engine system where the first search engine system utilized a first index and a first scoring algorithm to respectively identify and score each of the first search results;
means for obtaining second search results responsive to the query from a second search engine system where the second search engine system utilized a second, different index and a second, different scoring algorithm to respectively identify and score each of the second search results;
means for determining a number of first search results that are authority results, wherein an authority result refers to an authority page of a business entity;
means for re-scoring a portion of the number of first search results that are authority results using the second scoring algorithm;
means for combining the re-scored first search results that are authority results with the second search results to generate combined second search results, wherein an authority result refers to an authority page of a business entity the authority results in the combined second search results are ordered to correspond to a relative order of authority results in the first search results if the number of first search results that are authority results exceeds a threshold; and
means for providing the combined second search results to a client device in response to the query.

14. A system comprising:
one or more memory devices storing instructions;
one or more computers in one or more locations, coupled to the one or more memory devices and executing the instructions stored thereon in order to implement:
a conjoiner engine configured to combine portions of local search results responsive to a query that are obtained from a local search engine system and universal search results responsive to the query that are obtained from a different universal search engine system, in which wherein the local search results and the universal search results have respective scores as determined by their respective search engine systems, wherein the conjoiner engine is further configured to identify a number of universal search results that are authority results, re-score a portion of the number of universal search results that are authority results using the local search engine system, and wherein the conjoiner engine is further configured to combine the re-scored universal search results that are authority results with the local search results to generate combined local search results, wherein an authority result refers to an authority page of a business entity the authority results in the combined local search results are ordered to correspond to a relative order of authority results in the universal search results if the number of universal search results that are authority results exceeds a threshold; and
a merger engine configured to provide the combined local search results to a client device in response to a query.

15. The system of claim 14 in which the re-ranker conjoiner engine is further configured to place the ordered authority results before other results in the combined local search results.

16. The system of claim 14 in which the business entity has a homepage and the authority page of the business entity is the homepage of the business entity.

17. The system of claim 14 in which a business entity corresponds to a unique street address, telephone number, and business title combination.

18. The system of claim 14 in which a business entity corresponds to a unique uniform resource locator and business title combination.

19. The system of claim 14 in which the merger engine is further configured to merge the combined local search results with the universal search results by positioning position the combined local search results at a position among the universal search results that is determined based on a number of authority results in a top number of universal search results.

20. The system of claim 14 in which the merger engine is further configured to combine matching results from the combined local search results and the universal search results into a single result.

21. The system of claim 20 in which matching results represent the same business franchise.

22. The system of claim 20 in which matching results represent the same authority result.

23. The system of claim 14 in which the merger engine is further configured to select a presentation format for the combined local search results based on a number of authority results in the universal search results.

24. The system of claim 23 in which the presentation format includes a quick scan column.

25. The system of claim 23 further comprising a client device configured to receive the merged results and the selected presentation format from the system.

* * * * *